United States Patent [19]
Sollerud

[11] 3,973,048
[45] Aug. 3, 1976

[54] METHOD FOR STERILIZING LIQUIDS BY BRIEF HEATING

[75] Inventor: Sören Elof Mauritz Sollerud, Norrkoping, Sweden

[73] Assignee: Tetra Pak Development SA, Lausanne, Switzerland

[22] Filed: Dec. 20, 1974

[21] Appl. No.: 534,961

[30] Foreign Application Priority Data
Dec. 21, 1973 Switzerland.................. 18104/73

[52] U.S. Cl................................. 426/522; 165/66; 426/521
[51] Int. Cl.².............................................. A23L 3/16
[58] Field of Search .......... 426/522, 521, 524, 520, 426/511, 506, 474; 62/268; 165/66

[56] References Cited
UNITED STATES PATENTS

| | | | |
|---|---|---|---|
| 1,541,994 | 6/1925 | Nielsen.............................. | 426/522 |
| 2,022,420 | 11/1935 | Hammer et al................ | 426/522 X |
| 2,732,308 | 1/1956 | Laguilharre........................ | 426/474 |
| 3,512,998 | 5/1970 | Clark................................... | 426/522 |

FOREIGN PATENTS OR APPLICATIONS

| | | | |
|---|---|---|---|
| 112,277 | 12/1939 | Australia............................. | 165/66 |
| 501,368 | 2/1971 | Switzerland........................ | 426/522 |

Primary Examiner—S. Leon Bashore
Assistant Examiner—Kenneth M. Schor
Attorney, Agent, or Firm—Ladas, Parry, Von Gehr, Goldsmith & Deschamps

[57] ABSTRACT

The invention provides a method for sterilizing liquids by brief heating, comprising exposing a pressurized stream of already sterilized liquid to a pressure reduction, an evaporable partial quantity of the liquid being induced to assume vapor form while the remaining part of the liquid quantity is cooled, introducing vapor thus formed into a compressor in which said vapor is compressed and is heated due to said compression and is mixed with and condensed in a stream of pressurized liquid which is supplied to the compressor and, by being mixed with ward condensate, is raised to a temperature which is equal to or exceeds that required for sterilization, and maintaining the sterilization temperature of the said heated and pressurized stream of liquid for the length of time required for sterilization, whereupon the liquid is subjected to the initially-mentioned pressure reduction during which an evaporable part quantity of the liquid is evaporated and is again subjected to the treatment cycle while the remaining and simultaneously cooled quantity of sterilized liquid is drained off. The invention also provides apparatus for carrying out the method of the invention.

13 Claims, 3 Drawing Figures

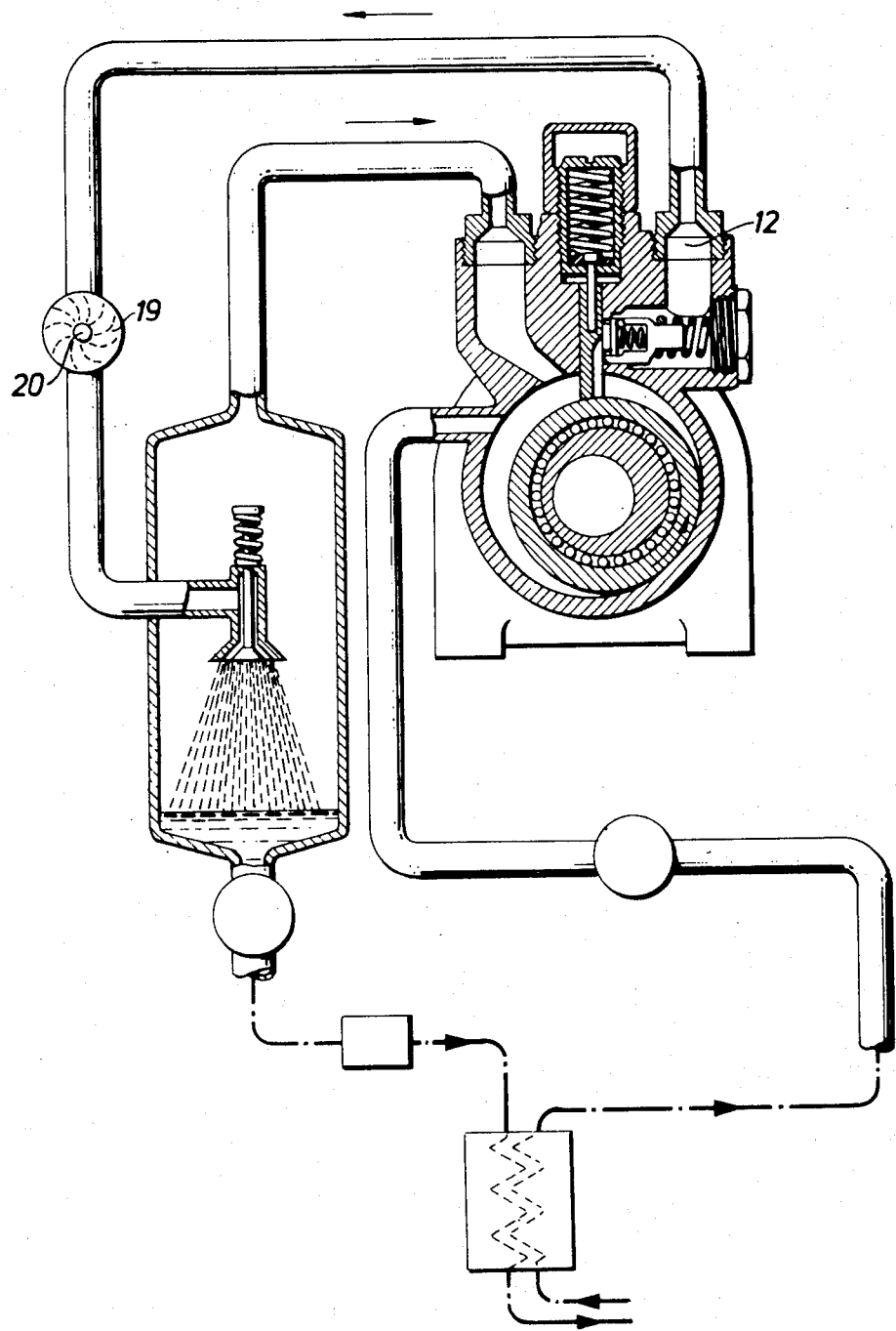

METHOD FOR STERILIZING LIQUIDS BY BRIEF HEATING

BACKGROUND OF THE INVENTION

The present invention relates to a method for sterilizing liquids by brief heating and to apparatus for performing the method.

Increasing use has been made recently of sterilizing liquids for storage followed by packaging of such liquids in sterile packages under sterile conditions in order to permit prolonged storage of such liquids, more particularly liquid foodstuffs such as milk, cream and fruit juices. Different methods are used for sterilizing a liquid, for example the mechanical treatment of the liquid with repeated pressure variations, usually of the ultrasonic kind. The most common method of sterilizing liquid however is heating the same for a sufficiently long period of time in order to inactivate all microorganisms and spores which may be present in the liquid. All the previously-mentioned sterilizing methods must be adapted to the kind of treated liquid, for example it is often inappropriate to sterilize liquid foodstuffs by means of a chemical sterilizing medium because this may also render the liquid unsuitable as foodstuff while it may be advantageous for other liquids, for example effluents containing certain kinds of bacteria, to be sterilized by means of sterilizing media.

Although the method according to the present invention can be used for sterilizing most liquid products its most important field of use is undoubtedly the sterilization of milk and other liquid dairy products and fruit juices. Heat sterilization, for example of milk, causes this to assume an unpleasant cooked flavour and the milk assumes a slight brown discoloration which also substantially impairs the quality of the milk. One method of avoiding this flavour deterioration and discoloration of the milk is by heating it intensively for a short period of time, i.e. for approximately 2–5 seconds, to approximately 130°–150°C followed by instant cooling to a temperature below 80°–90°C. Only very small quantities of chemical reaction products which impart an unpleasant flavour to the milk can be formed in such short heating of the milk and this is also not subjected to any noticeable discoloration. Several methods all of which provide a satisfactory sterilization result without any evident impairment of quality have been developed for such short-period heating of the milk. However, these methods suffer from the disadvantage that they consume a large quantity of energy and are therefore expensive.

In the method according to the present invention the liquid is also treated so that it is heated for a short period to the sterilizing temperature and is then instantly cooled but by comparison with known methods the method according to the invention requires substantially less energy.

SUMMARY OF THE INVENTION

The invention provides a method for sterilizing liquids by brief heating, comprising exposing a pressurized stream of already sterilized liquid to a pressure reduction, an evaporable partial quantity of the liquid being induced to assume vapor form while the remaining part of the liquid quantity is cooled, introducing vapour thus formed into a compressor in which said vapour is compressed and is heated due to said compression and is mixed with and condensed in a stream of pressurized liquid which is supplied to the compressor and, by being mixed with warm condensate, is raised to a temperature which is equal to or exceeds that required for sterilization, and maintaining the sterilization temperature of the said heated and pressurized stream of liquid for the length of time required for sterilization, whereupon the liquid is subjeceted to the initially-mentioned pressure reduction during which an evaporable part quantity of the liquid is evaporated and is again subjected to the treatment cycle while the remaining and simultaneously cooled quantity of sterilized liquid is drained off.

In a further aspect the invention provides apparatus for performing the above method comprising a supply duct for liquid to be sterilized, a compressor having a suction side connected to said supply duct, and a delivery side, an expansion chamber including an inlet valve, and a pipeline connecting said delivery side of the compressor to said inlet valve of the expansion chamber, said expansion chamber also being connected to said suction side of the compressor, the cross-sectional surface area of said pipeline between the compressor and the inlet valve and its length being determined in relation to the operational flow rate of the liquid through the apparatus so that each liquid particle which flows through said pipeline dwells therein in operation for a defined length of time which is required for sterilizing treatment.

BRIEF DESCRIPTION OF THE DRAWINGS

Embodiments of the invention are described hereinbelow by reference to the accompanying diagrammatic drawings, in which:

FIG. 2 is a diagrammatic view of a section of the apparatus according to the invention and FIG. 3 is a modification of the view shown in FIG. 2.

DESCRIPTION OF PREFERRED EMBODIMENT

In the interests of clarity the symbols in the description hereinbelow are used so that one and the same detail shown in different Figures in all drawings has the same symbol. It is also assumed that the liquid for sterilization is milk which is available at a temperature of approximately 10°C in the untreated state.

Figure 1:
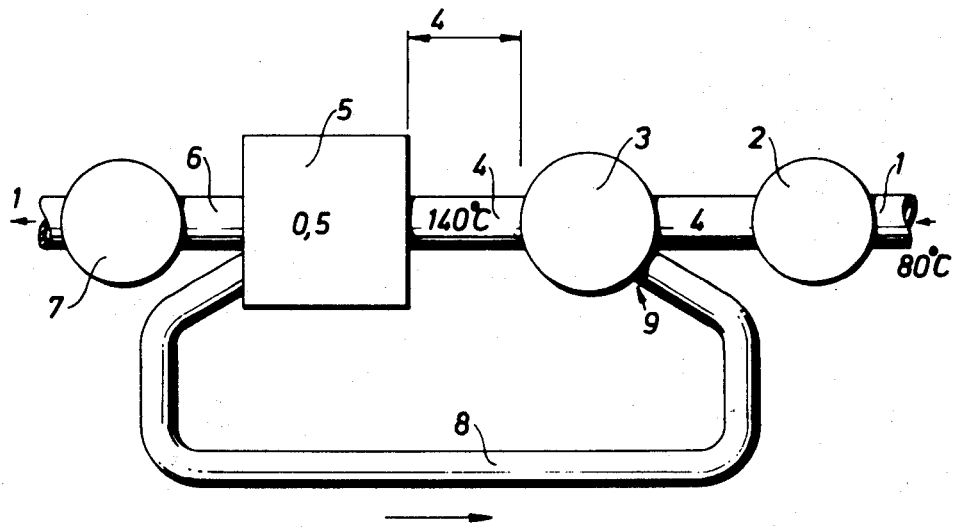
FIG. 1 is a flow diagram explaining the method according to the invention.

The principle of the invention is illustrated in FIG. 1 in which a supply duct for the untreated milk is referenced with the numeral 1 and a pump disposed in the said supply duct is referenced with the numeral 2. The system also incorporates a compressor 3 the delivery side of which is connected to a treatment chamber in the form of a treatment tube 4. The aforementioned treatment chamber 4 is in turn connected to a vacuum chamber or expansion chamber 5 from which a return duct 8 extends to the suction side of the compressor 3 to which the inlet duct 1 is also connected. The expansion chamber 5 is also connected to a discharge duct 6 in which a pump 7 is disposed.

The sterilizing process according to the invention is performed by milk, preheated to a temperature of approximately 80°C, being supplied in the supply duct 1. Milk can be maintained for a prolonged time at the aforementioned temperature without causing chemical changes in the milk which might result in impairment of flavour and discoloration. The pressure in the supply duct 1 is substantially equal to atmospheric pressure or is slightly higher, the pressure being however then raised by means of the pump 2 to approximately 4 atm gauge before the milk is introduced into the compressor. On the suction side of the compressor 3 the milk supplied thereto and pressurized by means of the pump 2 is mixed with water vapour which has formed in a manner to be described subsequently. The mixture of milk and vapour, in which the volume of vapour predominates substantially, is conducted through the compressor 3 while the vapour is compressed and the compressor is heated thereby. At the same time the vapour successively condenses in the milk to release further thermal energy which is due to the enthalpy of the vapour when this is condensed. Accordingly, on passing through the compressor 3 the milk is substantially heated by mixing with the hot condensate and all vapour in the milk is condensed on the delivery side of the compressor 3, the milk temperature increasing rapidly from approximately 80°C to approximately 140°C, i.e. a temperature which inactivates the microorganisms which occur in the milk. In order to achieve an adequate sterilizing effect the mixture is maintained at the stated temperature of 140°C for a period of approximately 4 seconds during which the said mixture of milk and condensate flows through the treatment chamber or treatment tube 4. The treatment chamber extends into an expansion chamber of vacuum chamber 5 in which a negative pressure of, for example, 0.5 atm abs exists. On entering the expansion chamber 5 the pressurized mixture of milk and condensate is exposed to a sudden pressure reduction which causes the temperature of the mixture to drop rapidly to approximately 80°C while the pressure reduction causes an evaporable part of the mixture, i.e. part of the water, to assume vapour form. The vapour thus formed is drawn through a return duct 8 to the suction side 9 of the compressor 3 whereupon the steam at a temperature of approximately 80°C together with the pressurized milk supplied from the suction side 9 of the compressor in the manner already described, is compressed by means of the compressor 3 to a positive pressure of approximately 4 atm gauge. The thermal content and the temperature of steam subjected to such compression increases and the steam condenses in the milk while being further heated because the enthalpy is liberated and supplied to the mixture of milk and condensate. The treatment cycle is continuously repeated in the manner described above, the milk being heated to the sterilizing temperature by being conducted through the compressor 3, the steam being compressed and condensed in the milk while the condensate or a corresponding quantity of water is again evaporated in the expansion chamber 5 while the temperature of the milk momentarily drops to a value at which no changes of flavour occur in the milk.

As previously mentioned, only part of the water is evaporated in the expansion chamber 5 while the remaining milk, having been subjected to a temperature reduction down to 80°C, accumulates at the bottom of the expansion chamber 5 and thereafter is pumped through a discharge duct 6 and by means of a pump 7 into a collecting tank, not shown, possibly after being previously homogenized and cooled.

It is evident from the description above that the invention is based on the principle that the milk for treatment is subjected to high pressure at which the temperature can be raised to the sterilizing temperature, i.e. approximately 140°C, without causing the water in the milk to boil. Heat treatment is rapidly and effectively interrupted by conducting the pressurized milk into an expansion chamber in which negative pressure prevails, the temperature of the milk instantaneously diminishing while at the same time part of the water changes into vapour form, a process requiring heat, the heat being given up by the milk and the walls of the expansion chamber. The vapour thus formed is returned to the process after having been drawn into a compressor in which the vapour is sufficiently compressed to ensure that it condenses while the milk, also supplied to the compressor 3, is simultaneously heated and the amount of vapour is adapted to the quantity of milk supplied to the system so that the temperature of the mixture corresponds to the desired sterilizing temperature of approximately 140°C. It is advantageous for the milk to be preheated, as already mentioned, for example to approximately 80°C, so that the amount of returned vapour need not be excessive.

Figure 2:
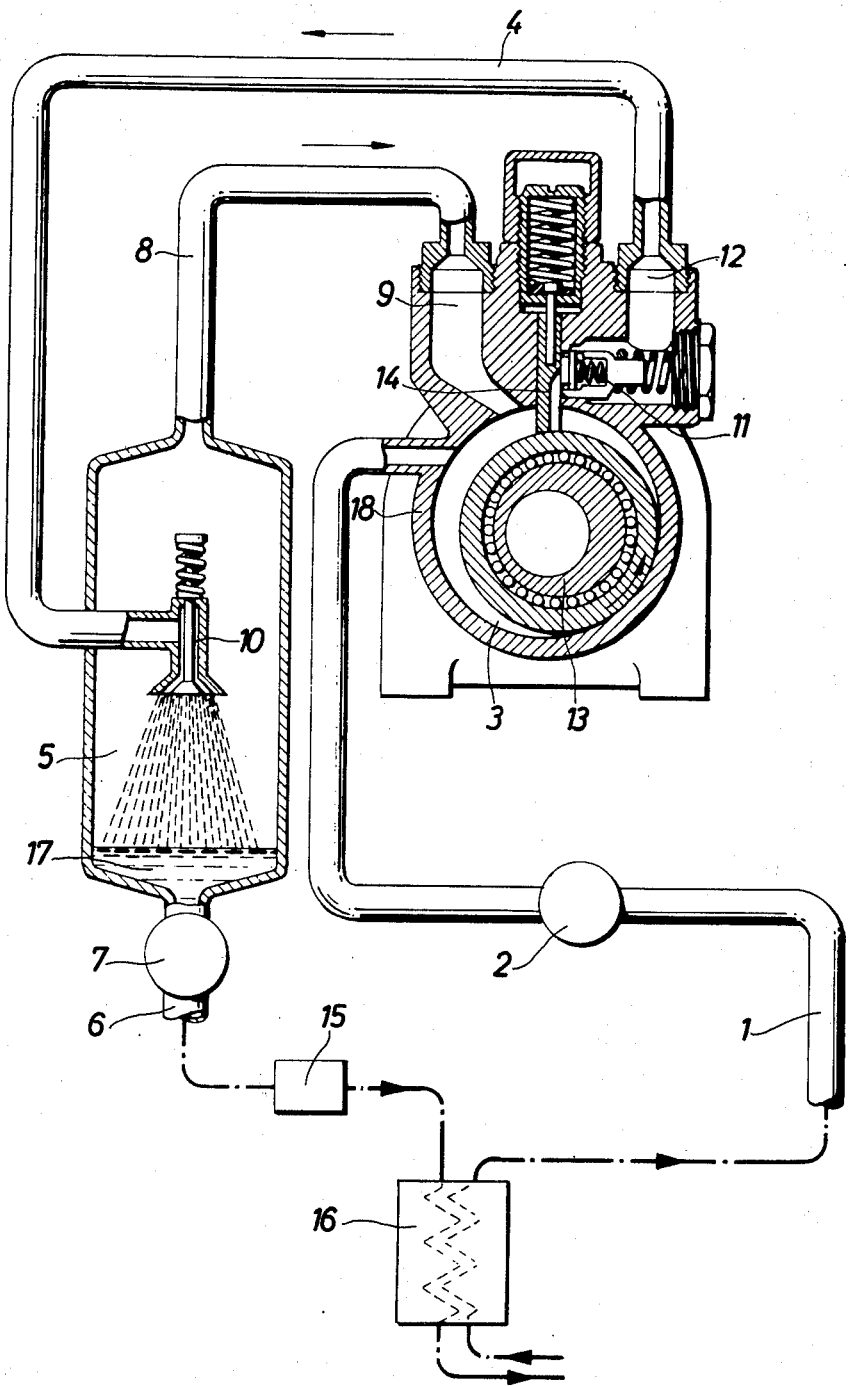

FIG. 2 is a section through apparatus according to the invention for performing the method, the supply duct for milk being referenced with the numeral 1, the pump for increasing the pressure in the pipeling 1 being referenced with the numeral 2 in the same way as in FIG. 1. In the illustrated exemplified embodiment compressor 3 is provided with a rotor 13 in the form of an eccentric rotary piston which is so disposed as to bear successively and sealingly on the interior of the compressor casing 18 during rotation. The compressor is also provided with a spring-biased seal plate 14 which bears on the surface of the rotor 13. The compressor 3 is also provided with a spring-biased discharge valve 11 by means of which the discharge pressure of the compressor 3 can be controlled. The pipeline 4 is connected immediately downstream of the discharge valve 11. The expansion chamber 5 communicates through the return duct 8 with the suction side 9 of the compressor 3 and is also connected to a discharge duct 6 in which a pump 7 is disposed. The pipeline 4 also extends into a pressure-controlled valve 10 in the expansion chamber 5 and, since the actual heat treatment of the milk takes place while the said milk passes through the pipeline 4, it is appropriate to provide the said pipeline with a thermally insulating external stratum but this is not shown. The discharge duct 6 for the sterilized milk accumulated in the expansion chamber 5 can be connected to a homogenizer 15, as shown diagrammatically in FIG. 2, the sterilized milk 17 being then supplied from the said homogenizer via a pipeline to a heat exchanger 16 in which the drained-off milk, having a temperature of approximately 80°C, gives up part of its heat to the cold incoming milk for sterilization which is supplied to the apparatus through the pipeline 1.

In this context it may be assumed that the milk for sterilization treatment has a temperature of approximately 10°C. It is supplied to the heat exchanger 16, as already mentioned, via the supply duct 1 in which the milk is heated so that it has a temperature of approximately 80°C, at the exit of the heat exchanger 16. The liquid pressure in the pipeline 1 is increased by means of the pump 2 to approximately 4 atm gauge. The output of the pump 2 is variable and, as will be described subsequently, the temperature can be regulated during the sterilization treatment of the milk by altering the output of the pump 2. As already explained, the pressurized milk is introduced into the suction side of the rotary compressor 3, the milk together with the vapour supplied from the expansion chamber 5 being compressed due to rotation of the rotor 13 so that the steam which is condensed in the milk while being simultaneously heated, acquires a temperature which is required for sterilization. The mixture of milk and condensate heated to a sterilizing temperature of approximately 140°C is pumped through the spring-biased delivery valve 11 and is pressed through the pipeline 4. Rotation of the rotor 13 also produces a negative pressure on the suction side 9 of the compressor 3, said suction side communication through the return duct 8 with the expansion chamber 5. The expansion chamber 5 is therefore evacuated by means of the compressor 3 and it is assumed that an average negative pressure of approximately 0.5 atm abs is produced in the expansion chamber 5. The water vapor formed in the expansion chamber 5 is drawn from there via the return duct 8 to the suction side of the compressor 3 where the said vapour is mixed with the milk supplied thereto and thereafter is compressed in the manner already described and heated, and finally condenses in the milk. The warm mixture of milk and condensate is pressed through the delivery valve 11 into the pipeline 4 by means of the rotor 13 of the compressor 3 and by means of the seal plate 14 which co-operates with the said rotor, steps being taken as already mentioned to ensure that the temperature of the mixture is approximately 140°C. A temperature-sensing element 12 is mounted on the delivery side of the compressor 3 or in the pipeline 4 and is connected to a controller, not shown, which in turn controls the output of the pump 2. If the temperature of the mixture of milk and condensate in the pipeline 4 tends to exceed the desired sterilizing temperature of 140°C, this temperature increase will be sensed by the element 12 which controls the pump 2 via the controller so that a larger quantity of milk is supplied to the suction side 9 of the compressor 3 and the temperature accordingly drops to the desired value. It is possible in like manner to increase the temperature of the mixture of milk and condensate by means of the controller if the temperature has a tendency to drop. The pressure-controlled valve 10 by means of which the pressure in the pipe 4 is maintained is connected at the end of the pipe 4 which extends into the expansion chamber 5. The length and cross-section of the pipe 4 are adapted to the flow rate of the liquid so that the dwell period of each liquid particle during the passage through the tube 4 corresponds to the time required for sterilization and which is stated to be 4 seconds in the example described herein. The pressure-controlled valve 10 in the expansion chamber 5 has an opening pressure of approximately 3.5 – 3.6 atm gauge and when the milk-condensate mixture in the pipeline 4 has reached a pressure which exceeds the opening pressure of the valve 10 the heated milk-condensate mixture will flow into the expansion chamber where the mixture is simultaneously and instantaneously pressure-relieved. This instantaneous pressure relief and expansion of the hot pressurized milk-condensate mixture ensures that an evaporable part quantity of the mixture, i.e. part of the water in the milk-condensate mixture, changes into vapour form while the required enthalpy is obtained from the milk and from the walls of the expansion chamber 5. At the prevailing negative pressure in the expansion chamber 5, the milk 17 is instantaneously cooled to approximately 85°C, this being accompanied by the formation of vapour. The vapour formed in the expansion chamber 5 is drawn via the return duct 8 to the suction side 9 of the compressor 3 whereupon the vapour together with the added untreated milk is compressed in the manner already described due to rotation of the rotor 13 by an amount which causes the vapour to be heated and to condense in the milk, whereupon the cycle of the process is repeated.

The sterilized quantity of milk 17 accumulated in the expansion chamber 5 is supplied by means of the pump 7 through the discharge duct 6 to the homogenizer 15 in which the sterilized milk is subjected to the conventional homogenizing process. The milk is further conducted through the discharge duct 6 to the heat exchanger 16 in which the warm milk, with a temperature of approximately 85°C, gives up its heat to the quantity of cold milk supplied through the supply duct 1 and having a temperature of approximately 10°C. Thereafter, the sterilized milk, cooled to 15°C, is conducted from the heat exchanger 16 to storage vessels where it is stored under sterile conditions until it is packaged in sterile packages. To prevent the level of the sterilized amount of milk 17 becoming excessive in the expansion chamber 5, it is appropriate to provide a probe in the expansion chamber 5 for tracing the level and for controlling the output of the pump 7 by means of a controller, not shown, so that the milk level in the expansion chamber 5 is always constant or nearly constant.

All essential features of the apparatus shown in FIG. 3 correspond to those of the apparatus shown in FIG. 2 and the process of sterilization is identical. The additional feature in the apparatus according to FIG. 3 is merely the provision in the duct 4 of a liquid turbine 19 adapted to utilize part of the pressure drop which occurs when the pressurized milk-condensate mixture is pressure-relieved. Since it is undesirable for the vapour to be already formed in the pipeline 4, it is possible for only a smaller part of the pressure gradient to be obtained via the turbine whose shaft 20 is connected via a transmission to the drive shaft of the compressor 3. Part of the energy required for driving the compressor 3 is thus supplied by the turbine 19, a feature which also reduces the energy required for performing the method.

Each part-process has been separately explained in the description above, for example the introduction of vapour and milk into the compressor, the treatment in the compressor where the vapour is compressed and condensed in the milk, the transfer of the milk and condensate mixture heated to sterilizing temperature to the expansion chamber and the evaporation in the expansion chamber. This is of course a continuous process so that all parts thereof take place simultaneously and the milk intended for treatment is pumped continuously into the system and sterilized milk is likewise continuously discharged from the system.

The embodiment described herein is merely intended to illustrate one suitable embodiment but the design of the compressor as well as of the expansion chamber can be modified. For example, instead of using a rotary piston compressor of the kind shown it is also possible to use a screw compressor or some other compressor kind.

It has been shown that the method or apparatus described hereinabove is capable of sterilizing milk while using substantially less energy than would be the case with other sterilization methods of comparable quality. Furthermore, the manufacture of the sterilizing apparatus is relatively inexpensive and its construction can be very compact, so that little space is required for the apparatus. The sterilizing result obtained by means of the method or the apparatus relating thereto has been found very satisfactory and no deterioration of flavour or discoloration of the sterilized milk is noticeable. Since no fresh vapour is supplied to the system but the same evaporable partial quantity of liquid circulates constantly through the system, partially in the form of condensate and partially as vapour, it avoids the risks which always occur if an additional medium is to be supplied to a sterile system. Furthermore, the method or apparatus described hereinbefore offers the advantage that the milk is not diluted with the condensate, since the vapour required for sterilization and the condensate circulate constantly, which means that the sterilized milk 17 has the same water content as the milk supplied to the system.

We claim:

1. A method for sterilizing liquids by brief heating, comprising exposing a pressurized stream of already sterilized liquid to a pressure reduction, an evaporable partial quantity of the liquid being induced to assume vapour form while the remaining part of the liquid quantity is cooled, introducing vapour thus formed into a compressor in which said vapour is compressed and is heated due to said compression and is mixed with and condensed in a stream of pressurized liquid which is supplied to the compressor and, by being mixed with warm condensate, is raised to a temperature which is equal to or exceeds that required for sterilization, and maintaining the sterilization temperature of the said heated and pressurized stream of liquid for the length of time required for sterilization, whereupon the liquid is subjected to the initially-mentioned pressure reduction during which an evaporable part quantity of the liquid is evaporated and is again subjected to the treatment cycle while the remaining and simultaneously cooled quantity of sterilized liquid is drained off.

2. A method according to claim 1, wherein the liquid for sterilization treatment is preheated before being pressurized.

3. A method according to claim 2, wherein preheating takes place in a heat exchanger in which the drained-off, warm, sterilized liquid gives up heat to the liquid which is to be sterilized.

4. A method according to claim 1, wherein the dwell period for the sterilizing treatment of the liquid is defined at elevated temperature by volumes of the pipe connection between the compressor in which the vapour is condensed in the liquid supply to the compressor, and an expansion chamber in which the liquid is subjected to a pressure drop.

5. A method according to claim 1, wherein the output of a pump for generating pressure and supplying the liquid for sterilization is regulated by a controller.

6. A method according to claim 1, wherein the said controller is driven by a temperature transducer which is preferably disposed on the delivery side of the compressor.

7. A method according to claim 1, wherein the unevaporated sterilized liquid which remains in an expansion chamber after pressure reduction is pumped from the expansion chamber into a collecting tank either continuously or dependent on the liquid level in the expansion chamber while the liquid pressure is simultaneously increased to atmospheric pressure.

8. A method according to claim 1 wherein the vapour formed in an expansion chamber as the result of pressure reduction is compressed by means of the compressor and together with the liquid stream supplied to the said compressor to a pressure which is such that the thermal content of the vapour increases substantially and the vapour is condensed in the liquid, the required negative pressure being simultaneously maintained in the expansion chamber by means of the compressor.

9. A method according to claim 1, wherein the liquid for sterilization is preheated from a temperature of approximately 4° to 10°C, that the pressure of the liquid is raised by means of a pump to approximately 4 atm gauge and that the liquid is heated by vapour being compressed with and being condensed in said liquid which is raised to a temperature of approximately 140°C while absorbing condensate and being maintained at said temperature for approximately 4 seconds whereupon the liquid is depressurized by being introduced into an expansion chamber through a pressure relief valve with an opening pressure of approximately 3 to 4 atm abs, the negative pressure in the expansion chamber being such that the sterilized liquid accumulated in the said expansion chamber is raised to atmospheric pressure by means of a pump while the vapour formed in the said expansion chamber is drawn to the suction side of the compressor and is compressed together with the liquid supplied to the compressor and is again condensed and mixed with the aforementioned liquid.

10. A method according to claim 1, wherein the liquid comprises milk, cream or fruit juices and that the evaporable part quantity of the liquid comprises water.

11. A method according to claim 1, wherein the heat required for sterilization is generated by compression and condensation of the formed vapour in a chamber, the maximum temperature of the bounding walls being not less than the maximum temperature of the liquid.

12. A method according to claim 1, wherein part of the pressure gradient resulting from pressure relief of the pressurized liquid which is heated to the sterilizing temperature is utilized by a turbine in which the pressure gradient is converted into mechanical work.

13. A method according to claim 12, wherein the abovementioned mechanical work is utilized for contributing to the drive of the compressor.

* * * * *